United States Patent
DesJardien et al.

(10) Patent No.: US 10,040,155 B2
(45) Date of Patent: Aug. 7, 2018

(54) AIR COOLED SPINDLE EXHAUST AIR REDIRECTION SYSTEM FOR ENHANCED MACHINING BYPRODUCT RECOVERY

(71) Applicant: The Boeing Company, Chicago, IL (US)

(72) Inventors: Matthew R. DesJardien, Kenmore, WA (US); Samuel Chew, Bothell, WA (US); Donald J. Best, Arlington, WA (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 15/000,317

(22) Filed: Jan. 19, 2016

(65) Prior Publication Data

US 2017/0203401 A1    Jul. 20, 2017

(51) Int. Cl.
*B23Q 11/00* (2006.01)
*B23Q 11/12* (2006.01)

(52) U.S. Cl.
CPC .......... *B23Q 11/006* (2013.01); *B23Q 11/005* (2013.01); *B23Q 11/0046* (2013.01); *B23Q 11/127* (2013.01); *Y02P 70/171* (2015.11); *Y10T 408/44* (2015.01); *Y10T 408/46* (2015.01); *Y10T 408/50* (2015.01); *Y10T 408/5623* (2015.01)

(58) Field of Classification Search
CPC . B23Q 11/0046; B23Q 11/005; B23Q 11/006; B23B 2251/68; Y10T 408/44; Y10T 408/46; Y10T 408/50; Y10T 408/5623; Y10T 408/56253
See application file for complete search history.

(56) References Cited

U.S. PATENT DOCUMENTS

| 4,037,982 | A | * | 7/1977 | Clement | B23Q 11/006 408/110 |
| 4,563,115 | A | * | 1/1986 | Abe | B23Q 11/0046 408/241 G |
| 4,738,571 | A | * | 4/1988 | Olson | B23Q 11/0046 408/67 |
| 4,915,550 | A | * | 4/1990 | Arai | B23Q 3/069 408/56 |
| 4,946,322 | A | | 8/1990 | Colligan | |
| 4,986,703 | A | * | 1/1991 | Hampl | B23Q 11/006 144/252.1 |
| 5,024,562 | A | * | 6/1991 | Arai | H05K 3/0047 408/1 R |
| 5,033,917 | A | * | 7/1991 | McGlasson | B23B 49/02 408/241 B |

(Continued)

FOREIGN PATENT DOCUMENTS

| GB | 2269551 A | 2/1994 |
| GB | 2284664 A | 6/1995 |

(Continued)

*Primary Examiner* — Eric A Gates
(74) *Attorney, Agent, or Firm* — Felix L. Fischer

(57) ABSTRACT

A drilling byproduct recovery system employs a vacuum shroud positioned adjacent a workpiece. A spindle extends from a base and engages a tool. The spindle vertically reciprocates the tool upwardly through an aperture in the vacuum shroud to engage the workpiece. A circumferential air jet is emitted proximate a base of the spindle and directed toward the vacuum shroud.

20 Claims, 8 Drawing Sheets

(56) References Cited

U.S. PATENT DOCUMENTS

| | | | | |
|---|---|---|---|---|
| 5,299,894 | A * | 4/1994 | McCowin | B23B 47/28 408/1 R |
| 5,332,341 | A * | 7/1994 | Arai | B23Q 3/002 408/61 |
| 5,332,343 | A * | 7/1994 | Watanabe | B23Q 3/002 408/56 |
| 5,356,245 | A * | 10/1994 | Hosoi | B08B 15/04 408/56 |
| 5,451,126 | A * | 9/1995 | Brun | B23B 51/042 408/1 R |
| 5,458,443 | A * | 10/1995 | Belge | B21J 15/10 408/129 |
| 5,474,116 | A | 12/1995 | Shoda | |
| 5,544,986 | A * | 8/1996 | Kudo | B23B 49/04 408/61 |
| 5,584,618 | A * | 12/1996 | Blankenship | B23B 31/22 408/1 R |
| 5,779,402 | A * | 7/1998 | Kameda | B23Q 11/006 408/56 |
| 6,036,412 | A * | 3/2000 | Dalla | B23Q 11/0046 408/56 |
| 6,164,881 | A | 12/2000 | Shono | |
| 7,134,817 | B2 * | 11/2006 | Kado | B23Q 11/0046 408/16 |
| 7,160,063 | B2 * | 1/2007 | Wood | B23Q 11/0046 408/61 |
| 7,226,251 | B2 * | 6/2007 | Janson | B23B 47/34 408/1 R |
| 7,934,892 | B2 * | 5/2011 | Fritsche | B23B 49/023 408/56 |
| 8,002,503 | B2 * | 8/2011 | Gamboa | B23Q 11/0046 408/1 R |
| 8,202,027 | B2 * | 6/2012 | Katagiri | B23Q 11/005 175/209 |
| 8,337,124 | B2 * | 12/2012 | Nguyen | B23B 49/02 408/1 R |
| 9,067,292 | B2 * | 6/2015 | Appel | B23Q 11/0071 |
| 2005/0105975 | A1 | 5/2005 | Wood et al. | |

FOREIGN PATENT DOCUMENTS

| | | | | |
|---|---|---|---|---|
| JP | 07156038 A | * | 6/1995 | ......... B23Q 11/0046 |
| JP | 07276180 A | * | 10/1995 | ......... B23Q 11/0046 |
| JP | 09262710 A | * | 10/1997 | ........... B23Q 11/006 |
| JP | 2000005910 A | | 1/2000 | |
| JP | 2007260785 A | * | 10/2007 | |
| JP | 3168824 U | * | 6/2011 | |
| JP | 2014188639 A | | 10/2014 | |

* cited by examiner

AIR COOLED SPINDLE EXHAUST AIR REDIRECTION SYSTEM FOR ENHANCED MACHINING BYPRODUCT RECOVERY

BACKGROUND INFORMATION

Field

Embodiments of the disclosure relate generally to the field of manufacturing machining systems and more particularly to a chip recovery system for machines employing redirected spindle cooling air for creation of a supplemental conical updraft jet converging at a focal point proximate a vacuum recovery port.

Background

Traditional aircraft wing assembly has been done in a vertical orientation. However, as manufacturing systems are driving for higher rates and increased productivity the trend is to move to horizontal build lines. While horizontal build offers many advantages, it adds a large amount of overhead drilling. Drilling "up" leads to an increased focus on drill byproduct recovery, as any non-recovered chips, coolant, or dust will fall onto the drill, end effector, operator, and any machine components below. These contaminants may lead to mechanical issues in drilling systems, pose an environmental issue, and/or reduce machine effectiveness. Vacuum recovery systems are employed in current drilling systems but may not create sufficient pressure differential to capture all chips, coolant or dust created as drilling byproduct.

Traditionally, spindles have operated with a liquid coolant flowing through them to remove heat during operation. Liquid coolers ("chillers") are heavy, require plumbing of a closed system, and add a service item to machines. Increasingly, air cooled spindles are therefore being employed. The air flooded through the spindle to remove heat is typically exhausted to an atmospheric vent as a waste product.

SUMMARY

Embodiments disclosed herein provide a drilling byproduct recovery system employing a vacuum shroud positioned adjacent a workpiece. A spindle extends from a base and engages a tool. The spindle vertically reciprocates the tool upwardly through an aperture in the vacuum shroud to engage the workpiece. A circumferential air jet is emitted proximate a base of the spindle and directed toward the vacuum shroud.

The embodiments provide a method for drilling byproduct recovery wherein a vacuum is drawn through a vacuum shroud positioned adjacent a workpiece and over a drill spindle assembly. A circumferential air jet is provided at a base of the drill spindle assembly directed toward the vacuum shroud. The drill spindle assembly is then reciprocated upward through an aperture in the vacuum shroud.

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide a system to enhance capture of drilling byproduct for overhead drilling systems and to repurpose spindle cooling air for additional benefit rather than atmospheric venting as waste. More specifically, embodiments disclosed herein provide a system for redirection of spindle cooling exhaust air for a second function in drilling byproduct recovery. While disclosed herein for embodiments employing a drilling machine the structure and method hereof may be employed in alternative embodiments for byproduct recovery in machining systems for reaming, milling, spot facing, countersinking, counterboring, orbital drilling or sanding/abrading.

The air is plumbed from the cooling system exit to a part, or set of parts, providing a manifold that redirect the air flow in a series of jets that converge at a focal point and create a positive pressure area behind the drill urging drilling byproducts upward into a vacuum collection system. Any loose chips, dust, or other byproducts of drilling are thereby prevented from escaping and dirtying the larger system. By converging this air flow with a conical pattern to a focal point, any loose chips, dust, or other byproducts of drilling are prevented from escaping and dirtying the larger system. Using the drill cooling air exhaust as a supply, no additional programmatic controls are needed. The exhausted cooling air is flowing whenever the drill is spinning and therefore requiring spindle cooling. Three-dimensional (3D) printing technologies may be employed to create complex internal cavities in the flow manifold that redirect and aims the jets of air to create a focal point behind the tool. These internal cavities may not be producible from a single part using traditional machining operations and would typically have required casting technologies to implement.

Figure 1:
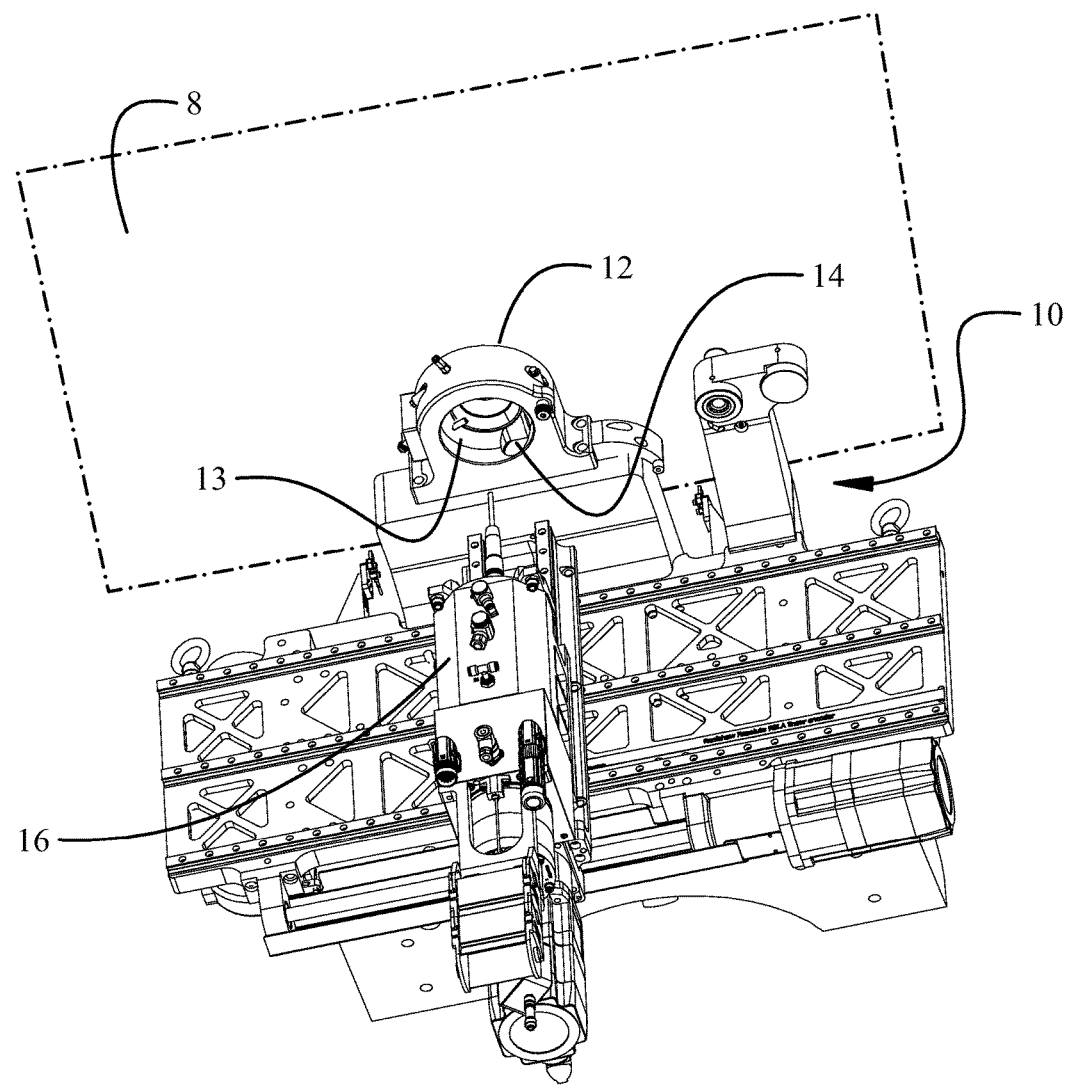
FIG. 1 is a pictorial view of an exemplary overhead drilling system employing an embodiment as disclosed herein.

Referring to the drawings, FIG. 1 shows a drilling system 10 designed for overhead drilling on a workpiece (shown in phantom as element 8) in an assembly line such as an aircraft wing horizontal assembly line. The drilling system 10 includes a pressure foot 12 and a drill spindle assembly 16 located vertically below the pressure foot for upward operation.

Figure 2:
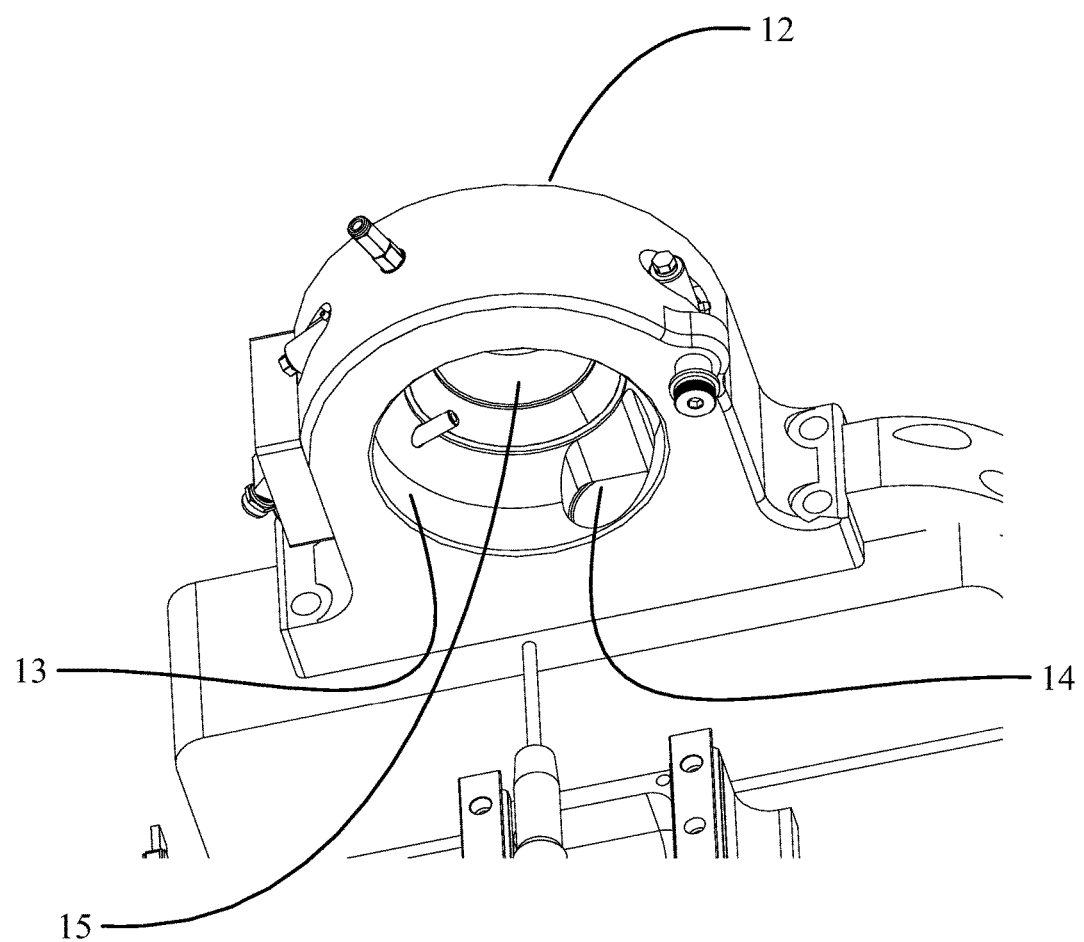
FIG. 2 is a detailed pictorial view of the pressure foot of the drilling system of FIG. 1 showing the vacuum conduit.

As seen in detail in FIG. 2, the pressure foot 12 incorporates an integrated vacuum shroud 13 with a vacuum conduit 14 employed for capture and removal of drilling byproducts. The vacuum shroud 13 is positioned with the pressure foot 12 adjacent the workpiece and has an aperture 15 large enough to accommodate various drill spindles or other tools attached to the drill spindle assembly for operating on the workpiece.

Figure 3:
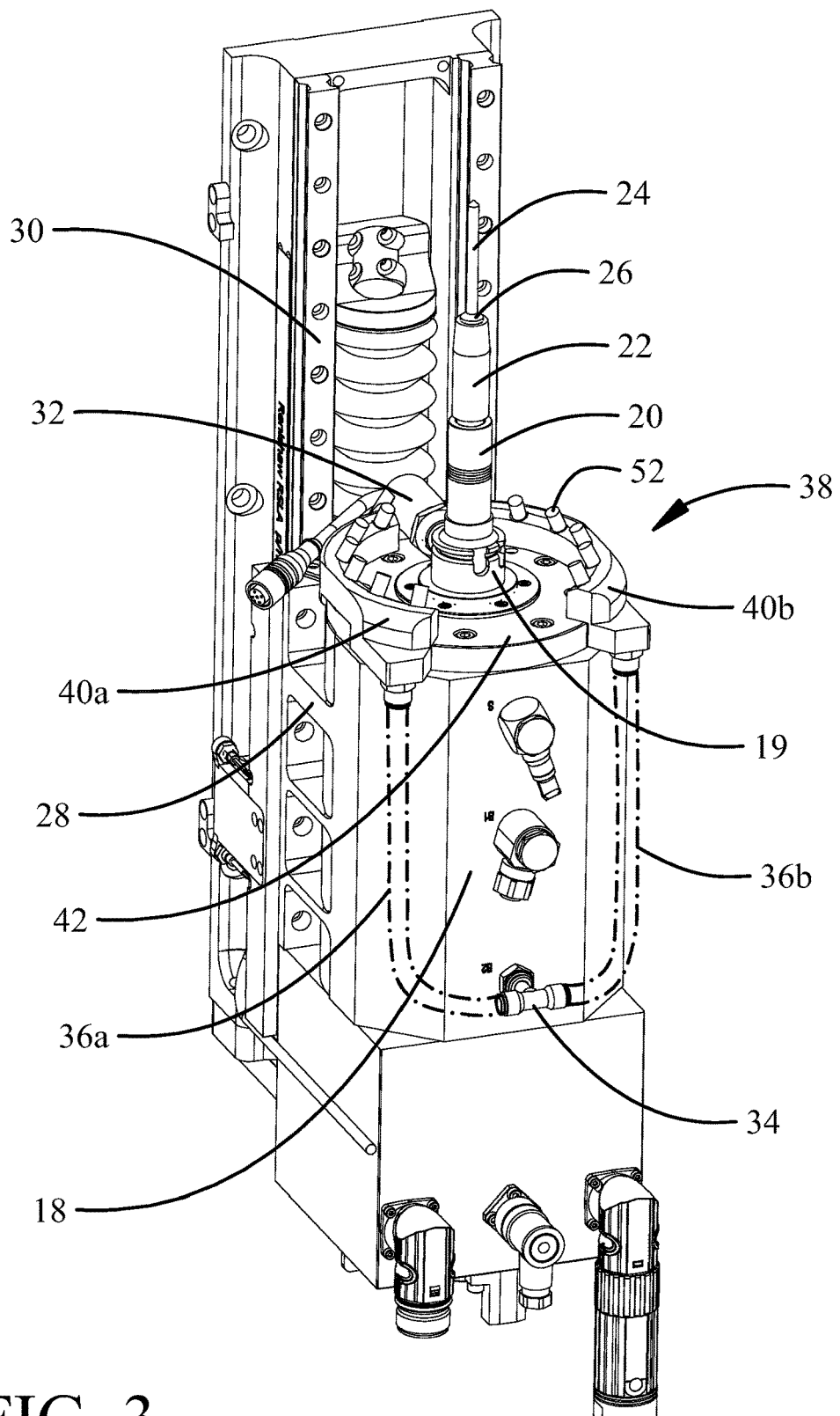
FIG. 3 is a detailed pictorial view of the drill spindle of the drilling system of FIG. 1 showing the spindle air flow direction manifold.
Figure 4A:
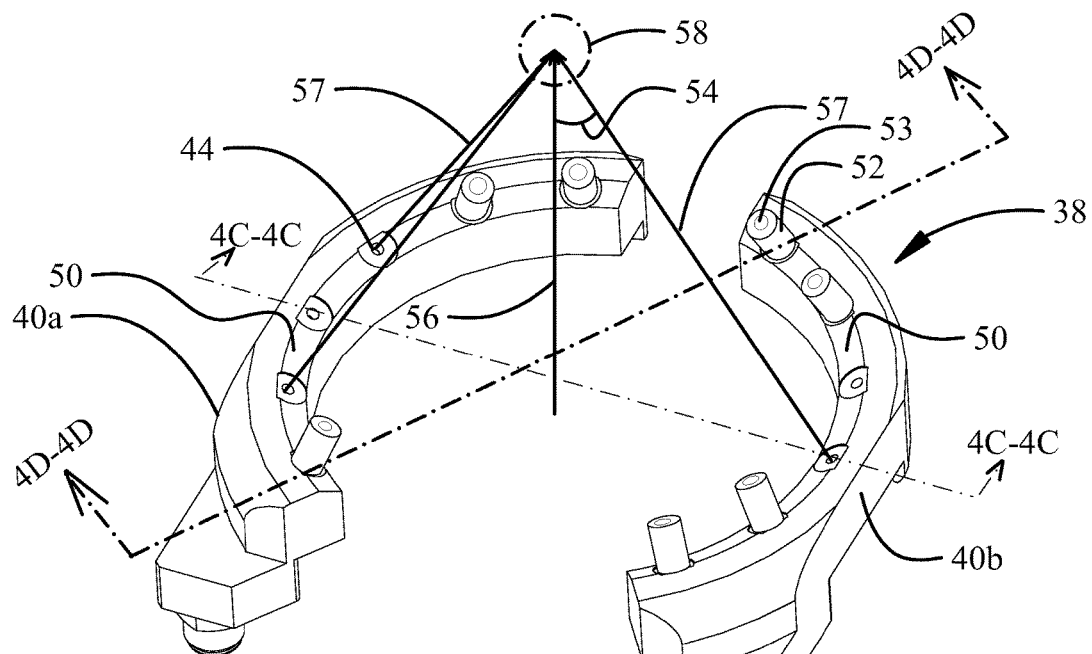
FIG. 4A is a detailed view of the spindle air flow direction manifold.
Figure 4B:
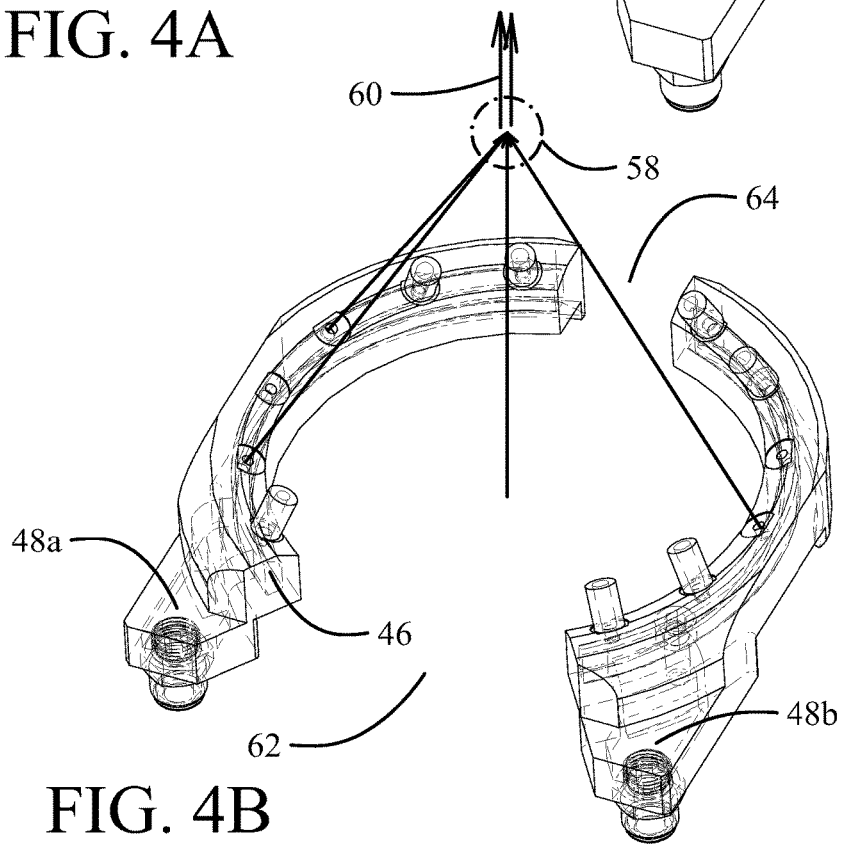
FIG. 4B is a detailed hidden line view of the spindle air flow direction manifold showing the air conduits.
Figure 4C:
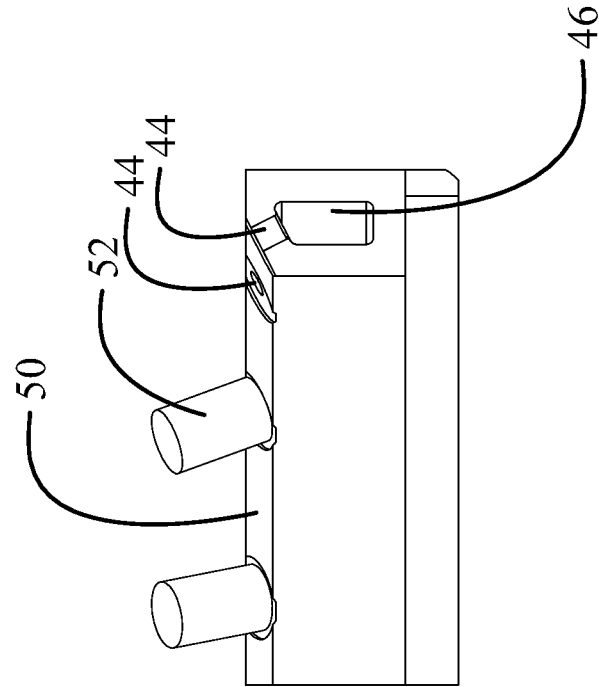
FIG. 4C is a section view along line 4C-4C in FIG. 4A.
Figure 4C:
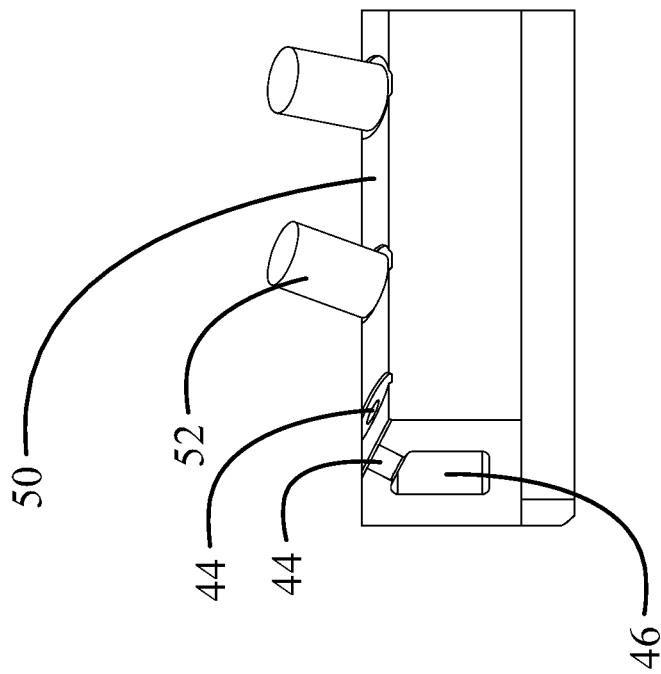
Figure 4D:
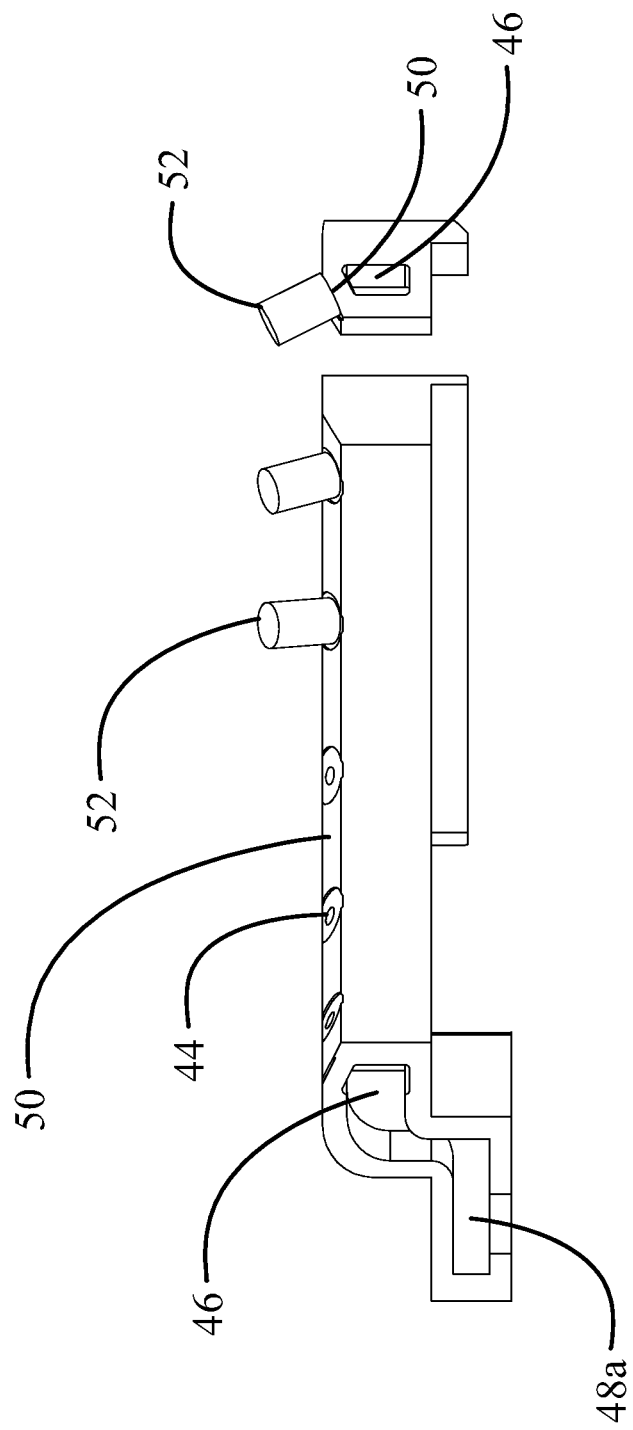
FIG. 4D is a section view along line 4D-4D of FIG. 4A.

The drill spindle assembly 16 in the drilling system 10 is shown in detail in FIG. 3 and includes a motor drive system 18 with a rotating base 19 from which a drill spindle 20 (also referred to as a spindle) extends with an associated collet 22 in which machining tools such as a drill bit 24 and reamer 26 may be mounted. Accordingly, the spindle 20 extends from the base 19 and engages a tool. The drill spindle assembly 16 is mounted with a trolley 28 on a vertical track 30 allowing vertical reciprocation of the assembly for operation to drive the spindle and associated drill upwardly from initial contact with the workpiece to be drilled to an operational termination where the drilling is complete. For the embodiment shown, the reamer 26 is positioned at the operational termination of the drill spindle for the vertical motion of the drill spindle assembly and the drill bit 24 and reamer 26 reciprocate through the aperture 15 in the vacuum shroud 13 (as seen in FIGS. 1 and 2) to drill and ream holes in the workpiece. A cooling air supply conduit 32 is plumbed to the base 19 for cooling of the spindle motor drive system during high speed rotation of the drill spindle. Cooling air is routed internal to the drill spindle assembly 16 for cooling of the motor and drive components (not shown) and exits in a fitting 34. Feed conduits 36a and 36b direct the exiting cooling air to a manifold 38. For the embodiment shown to allow clearance for the cooling air supply conduit 32, the manifold 38 is divided into a first half manifold 40a and a second half manifold 40b which are mounted to a top flange 42 of the motor drive system 18 proximate the base 19.

As seen in detail in FIGS. 4A through 4D, the manifold 38 incorporates a plurality of orifices 44 connected to internal channels 46 receiving air flow from inlet galleries 48a and 48b connected to the feed conduits 36a and 36b. The orifices 44 penetrate through a circumferential angled surface 50 to create a circumferential air jet substantially surrounding the base of the drill spindle 20 and directed upward toward the vacuum shroud 13. For the embodiment shown nozzle units 52 are inserted in the orifices (shown in the figures on only a portion of the orifices) with conduits 53 for enhanced flow control. Circumferential angled surface 50 has an angle 54 with respect to a spindle axis 56 whereby air exiting the orifices 44 is directed in a conical pattern (represented by arrows 57) to a focus (represented by element 58). For the example shown, focus 58 is located at a base of the drill bit 24 proximate the base of the reamer 26. Air exiting from the focus 58 provides an uplift column 60 urging any drilling byproducts including chips, coolant or dust upward for capture within a suction pattern of the vacuum shroud 13 in the pressure foot 12 to be drawn through the vacuum conduit 14. Ideally, at the focus 58 where the flow from all the orifices 44 meets all momentum would be converted to axial motion, because the radial vector components would cancel. Some turbulent flow may exist, but the net flow is along the spindle axis, so the uplift carries drilling byproduct into the vacuum shroud independent of the drill length or distance removed from the shroud.

The uplift column 60 extends from the focus for continuing effectiveness as the operational termination, the reamer for the exemplary embodiment, approaches the workpiece held by the pressure foot. Upward reciprocation of the drill spindle assembly 16 stops with the operational termination received in the aperture 15 in the vacuum shroud 13, reaming contact of the reamer 26 on the workpiece for the embodiment as described. All byproducts of the machining operation remain directed upward by the uplift column 60 toward the focus 58 encircled by the vacuum shroud 13 in that configuration. For the embodiment shown, the manifold 38 division into the half manifolds 40a and 40b provides a double crescent shape with a first aperture 62 exposing the base 19 and drill spindle 20 for easy access. Additionally the split configuration of the manifold provides a second aperture 64 for the cooling air supply conduit 32. In alternative machine embodiments, the manifold may be a continuous ring or a plurality of manifolds each with a subset of orifices arranged in opposed relation to create the conical flow pattern to focus 58.

Figure 5:
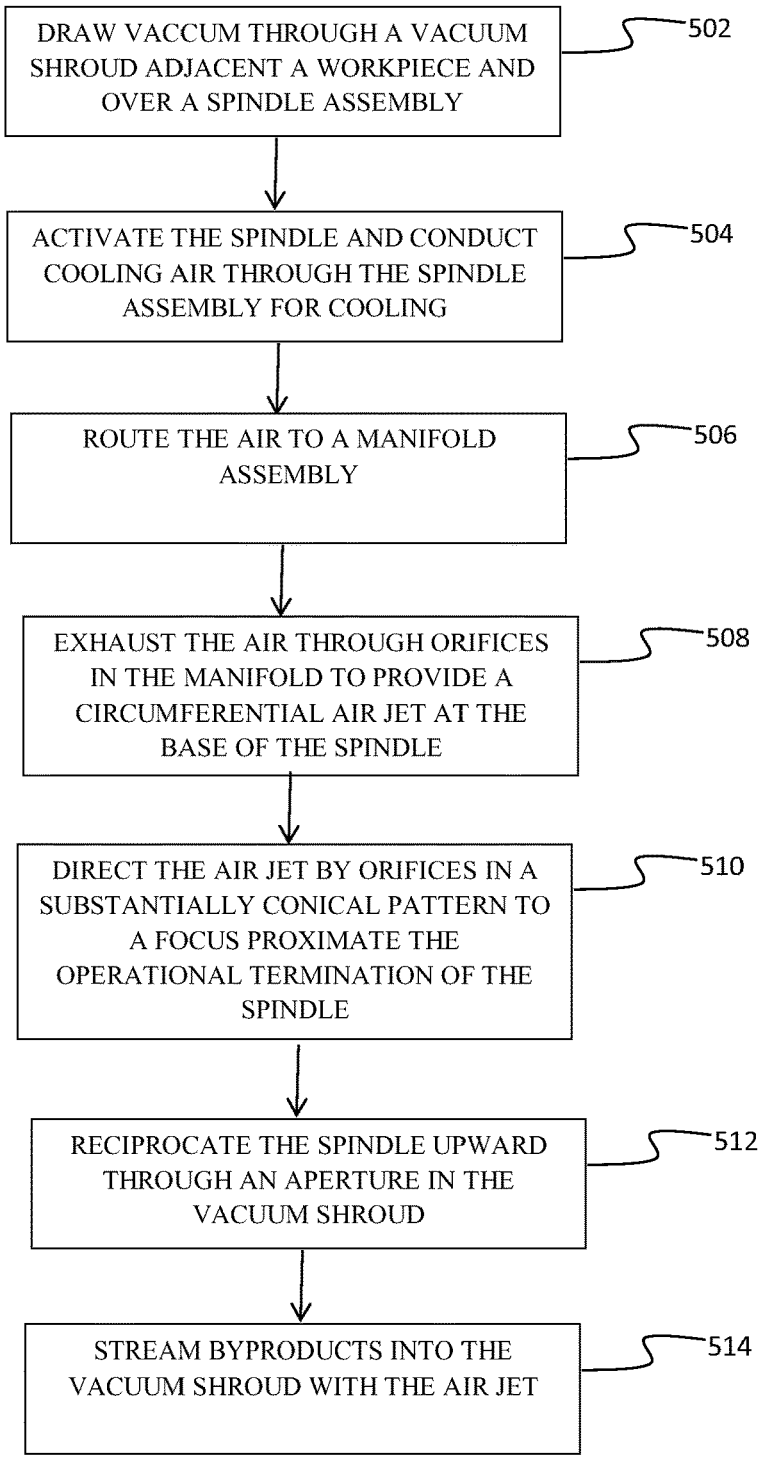
FIG. 5 is a flow chart showing a method for drilling byproduct recovery employing the disclosed embodiments.

For the example embodiment provide air pressure in the channels of the half manifolds is within a range of 65 to 90 pounds per square inch (psi) (448 to 620 kilopascals (kPa)) and nominally 75 psi (517 kPa) with orifice and nozzle units sized to provide flow rates of 6 to 8 cubic feet per minute (ft$^3$/min) (0.17 to 0.23 cubic meters per second (m$^3$/min)). Conduits in the nozzle units are shaped to have a substantially constant cross section to maintain a substantially constant velocity in the exiting air, to not accelerate or decelerate the air flowing through the nozzle unit. Substantially smooth transitions are provided to avoid back pressure that could negatively affect upstream systems by introducing back pressure to the system. The passages for the conduits in the nozzle units may be round, helical, any other shape or compartmentalized into a plurality of passages to distribute flow optimally. The ratio of these passage cross sections may be tuned to optimize jet velocities The embodiment disclosed allows a method of drilling byproduct recovery as shown in FIG. 5. Referring to FIGS. 1, 2 and 5, a vacuum is drawn through a vacuum shroud 13 positioned adjacent a workpiece 8 by a pressure foot 12 over a drill spindle assembly 16, step 502. The drill spindle assembly 16 is activated and cooling air is conducted through the drill spindle assembly 16 for cooling, step 504, and, further referred to FIG. 3, is then routed to a manifold 38 substantially surrounding a base 19 of a drill spindle 20 extending from the drill spindle assembly 16, step 506. The air is exhausted through orifices 44 in the manifold 38 to provide a circumferential air jet at the base 19 of the drill spindle 20, step 508, directed toward the vacuum shroud 13. The circumferential air jet is directed by the orifices 44 in a substantially conical pattern to a focus 58 proximate the operational termination of the drill spindle 20, step 510. The orifices 44 may penetrate an angled surface 50 on the manifold 38 to provide the desired conical pattern. Nozzle units 52 may be mounted in the orifices 44 for additional flow control. The drill spindle assembly 16 is reciprocated upward through an aperture 15 in the vacuum shroud 13 to drill or otherwise operate on the workpiece 8, step 512, and drilling byproducts are streamed by the air jet into the vacuum shroud 13, step 514.

Figure 6:
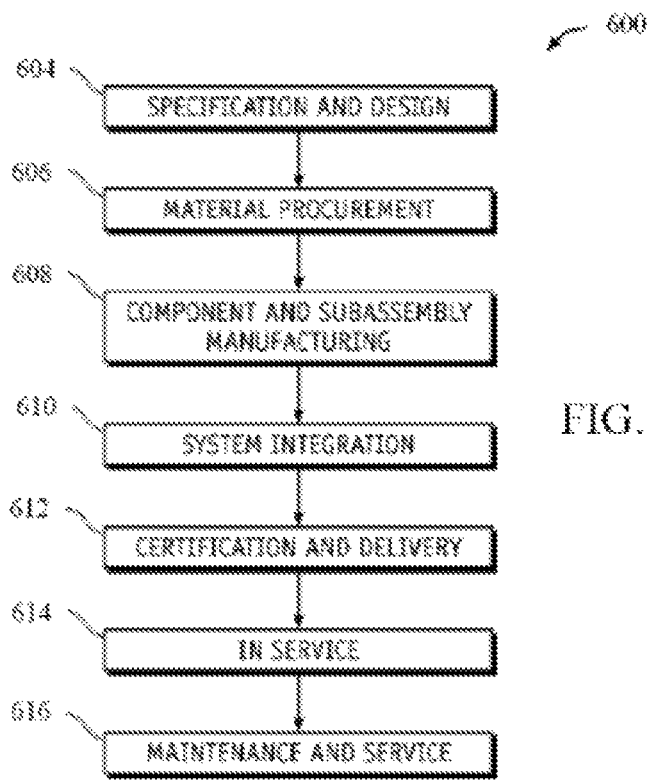
FIG. 6 is a flow chart depicting an aircraft manufacturing and service method in which the disclosed embodiments may be employed; and, FIG. 7 is a flow chart depicting an aircraft with which the disclosed embodiments may be employed.
Figure 7:
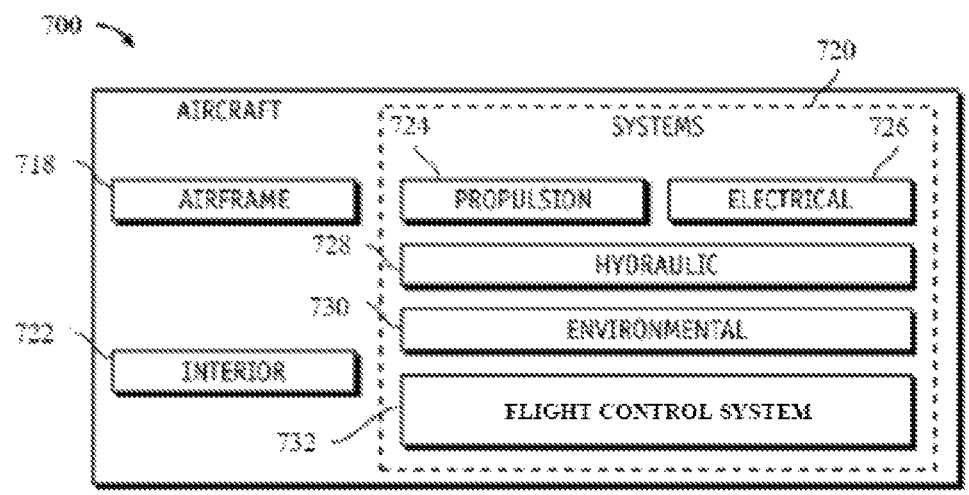

Embodiments of the disclosure may be employed in the context of an aircraft manufacturing and service method 600 (method 600) as shown in FIG. 6 and an aircraft 700 as shown in FIG. 7. During pre-production, the exemplary method 600 may include specification and design 604 of the aircraft 700 and material procurement 606. During production, component and subassembly manufacturing 608 and system integration 610 of the aircraft 700 takes place. Thereafter, the aircraft 700 may go through certification and delivery 612 in order to be placed in service 614. While in service by a customer, the aircraft 700 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 7, the aircraft 700 produced by the exemplary method 600 may include an airframe 718 with a plurality of systems 720 and an interior 722. Examples of high-level systems 720 include one or more of a propulsion system 724, an electrical system 726, a hydraulic system 728, an environmental system 730, and flight control system 732. Any number of other systems may also be included. Although an aerospace example is shown, the embodiments of the disclosure may be applied to other industries.

Apparatus and methods embodied herein and previously described may be employed during any one or more of the stages of the production and service method 600. For example, components or subassemblies corresponding to production process 608 may be fabricated or manufactured in a manner similar to components or subassemblies produced while the aircraft 700 is in service. In addition, one or more apparatus embodiments, method embodiments, or a combination thereof may be utilized during the production stages 608 and 610, for example, to substantially expedite assembly of or reducing the cost of an aircraft 700. Similarly, one or more of apparatus embodiments, method embodiments, or a combination thereof may be utilized while the aircraft 700 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A machining byproduct recovery system comprising:
   a vacuum shroud positioned adjacent below a workpiece;
   a spindle vertically separated below the vacuum shroud, extending from a base and engaging a tool, said spindle vertically reciprocating the tool upwardly through an aperture in the vacuum shroud to engage the workpiece; and
   a circumferential air jet emitted proximate the base of the spindle vertically spaced below and directed upwardly toward the vacuum shroud to a focus proximate an operational termination of the tool and encircled by the vacuum shroud thereby urging drilling byproducts upward for capture within a suction pattern of the vacuum shroud to capture byproducts above the spindle.

2. The machining byproduct recovery system as defined in claim 1 wherein the vacuum shroud is mounted in a pressure foot adapted to engage the workpiece.

3. The machining byproduct recovery system as defined in claim 1 wherein the spindle and the base are operably mounted in a motor drive system having a top flange and the circumferential air jet is emitted upwardly from a manifold mounted to the top flange.

4. The machining byproduct recovery system as defined in claim 3 wherein the motor drive system is incorporated in a drill spindle assembly mounted with a trolley on a vertical track allowing vertical reciprocation of the drill spindle assembly.

5. The machining byproduct recovery system as defined in claim 3 wherein the manifold incorporates a plurality of orifices substantially surrounding the base to create the upwardly directed circumferential air jet.

6. The machining byproduct recovery system as defined in claim 5 further comprising:
   a cooling air supply conduit operatively plumbed to the motor drive system to supply cooling air;
   a fitting connected to receive exhausted cooling air; and,
   at least one feed conduit connected between the fitting and the manifold.

7. The machining byproduct recovery system as defined in claim 6 wherein the at least one feed conduit is connected to internal channels in the manifold in fluid communication with the orifices.

8. The machining byproduct recovery system as defined in claim 7 wherein the internal channels in the manifold contain exhausted cooling air at between 65 and 90 pounds per square inch (psi) (448 to 620 kilopascals (kPa)).

9. The machining byproduct recovery system as defined in claim 7 wherein the manifold includes a circumferential angled surface penetrated by the orifices.

10. The machining byproduct recovery system as defined in claim 9 wherein the angled surface positions the orifices to emit the circumferential air jet in a conical pattern directed to the focus proximate the operational termination of the tool.

11. The machining byproduct recovery system as defined in claim 10 further comprising nozzle units operably connected to the orifices.

12. The machining byproduct recovery system as defined in claim 11 wherein the orifices and nozzle units are adapted to provide exhausted cooling air for the air jet at 6 to 8 cubic feet per minute (ft$^3$/min) (0.17 to 0.23 cubic meters per second (m$^3$/min)).

13. The machining byproduct recovery system as defined in claim 11 wherein the nozzle units incorporate conduits having a substantially constant cross section adapted to maintain constant flow velocity.

14. The machining byproduct recovery system as defined in claim 6 wherein the manifold comprises a first half manifold and a second half manifold in a double crescent shape with a first aperture exposing the base and the drill spindle and a second aperture receiving the cooling air supply conduit, said at least one feed conduit comprises a first feed conduit interconnecting the fitting with the first half manifold and a second feed conduit interconnecting the fitting with the second half manifold.

15. A method for machining byproduct recovery comprising:
    drawing vacuum through a vacuum shroud positioned adjacent below a workpiece and over a drill spindle assembly;
    directing a circumferential air jet from a base of the drill spindle assembly upward toward the vacuum shroud to a focus proximate an operational termination of a tool engaged in the drill spindle assembly thereby urging drilling byproducts upward for capture within a suction pattern of the vacuum shroud to capture byproducts above the spindle; and,
    reciprocating the drill spindle assembly upward through an aperture in the vacuum shroud.

16. The method as defined in claim 15 further comprising:
    conducting cooling air through the drill spindle assembly for cooling; and,
    routing the cooling air to a manifold substantially surrounding a base of a drill spindle extending from the drill spindle assembly.

17. The method as defined in claim 16 further wherein the step of directing a circumferential air jet comprises exhausting the cooling air through orifices in the manifold.

18. The method as defined in claim 17 wherein the circumferential air jet is directed by the orifices in a substantially conical pattern to the focus proximate the operational termination of the drill spindle.

19. The method as defined in claim 18 further comprising penetrating an angled surface in the manifold with the orifices to produce the conical pattern.

20. The method as defined in claim 19 further comprising mounting nozzle units in the orifices for flow control.

\* \* \* \* \*